United States Patent [19]

Irwin et al.

[11] Patent Number: 4,711,748

[45] Date of Patent: Dec. 8, 1987

[54] PREPARATION OF BLEACH CATALYST AGGREGATES OF MANGANESE CATION IMPREGNATED ALUMINOSILICATES BY HIGH VELOCITY GRANULATION

[75] Inventors: Charles F. Irwin, Randolph, N.J.; William Karpusiewicz, Floral Park; Patricia Liberati, Yonkers, both of N.Y.

[73] Assignee: Lever Brothers Company, New York, N.Y.

[21] Appl. No.: 926,708

[22] Filed: Nov. 12, 1986

Related U.S. Application Data

[63] Continuation-in-part of Ser. No. 805,529, Dec. 6, 1985, abandoned.

[51] Int. Cl.[4] ........................ B01J 29/16; B01J 37/02; B29C 67/02; C11D 3/395

[52] U.S. Cl. ................................. 264/117; 23/313 R; 252/95; 252/96; 252/102; 252/174; 252/174.12; 252/174.17; 252/174.25; 252/186.38; 252/186.39

[58] Field of Search ............... 23/313 R; 252/95, 102, 252/96, 174.17, 174.25, 186.38, 186.39; 264/117, 118

[56] References Cited

U.S. PATENT DOCUMENTS

| | | | |
|---|---|---|---|
| 3,398,096 | 8/1968 | Das et al. | 252/95 |
| 3,532,634 | 10/1970 | Woods | 252/95 |
| 3,789,002 | 1/1974 | Weber | 252/99 |
| 4,096,081 | 6/1978 | Phenicie | 252/140 |
| 4,184,975 | 1/1980 | Krings | 252/140 |
| 4,231,887 | 11/1980 | Denny | 252/174.19 |
| 4,261,941 | 4/1981 | Sherman | 264/117 |
| 4,288,340 | 9/1981 | Dankworth | 252/99 |
| 4,386,024 | 5/1983 | Maurer | 252/523 |
| 4,414,130 | 11/1983 | Cheng | 252/140 |
| 4,430,246 | 2/1984 | Sorbe | 252/140 |
| 4,444,674 | 4/1984 | Gray | 252/95 |
| 4,478,733 | 10/1984 | Oakes | 252/99 |
| 4,481,129 | 11/1984 | Oakes | 252/186.41 |
| 4,488,980 | 12/1984 | Oakes | 252/99 |
| 4,536,183 | 8/1985 | Namnath | 8/107 |
| 4,539,132 | 9/1985 | Oakes | 252/95 |
| 4,568,477 | 2/1986 | Oakes | 252/99 |
| 4,578,206 | 3/1986 | Walker | 252/95 |
| 4,579,678 | 4/1986 | Walker | 252/95 |
| 4,601,845 | 7/1986 | Namnath | 252/99 |
| 4,626,373 | 12/1986 | Finch et al. | 252/96 |
| 4,626,374 | 12/1986 | Finch et al. | 252/174.13 |

FOREIGN PATENT DOCUMENTS

| | | |
|---|---|---|
| 25608 | 3/1981 | European Pat. Off. . |
| 57088 | 8/1982 | European Pat. Off. . |
| 70079 | 1/1983 | European Pat. Off. . |
| 72166 | 2/1983 | European Pat. Off. . |

*Primary Examiner*—Dennis Albrecht

*Attorney, Agent, or Firm*—Milton L. Honig; James J. Farrell

[57] ABSTRACT

A process is disclosed for the preparation of bleach catalysts in aggregate form. The steps comprise adsorbing a manganese (II) salt onto an aluminosilicate support; granulating with a high disrupting force an aqueous slurry of the aluminosilicate bearing manganese (II), and drying the resultant aggregates. At least 70% of the dried aggregates resulting from the process must have a diameter size from at least 250 to about 2000 microns.

20 Claims, No Drawings

PREPARATION OF BLEACH CATALYST AGGREGATES OF MANGANESE CATION IMPREGNATED ALUMINOSILICATES BY HIGH VELOCITY GRANULATION

This is a continuation-in-part application of Ser. No. 805,529, filed Dec. 6, 1985, now abandoned.

BACKGROUND OF THE INVENTION

1. Field of the Invention

The invention relates to a process for preparing granulated supported manganese catalysts in aggregated form which catalysts, when formulated with peroxygen compounds, promote bleaching of flexible and hard surface substrates.

2. The Prior Art

Dry bleaching powders, such as those for cleaning laundry, generally contain inorganic persalts as the active component. These persalts serve as a source of hydrogen peroxide. Normally, persalt bleach activity in aqueous solution is undetectable where temperatures are less than 100° F. and delivery dosages less than 100 ppm active oxygen. The art has recognized, however, that bleaching under such mild conditions may be effectuated through the use of activators.

Manganese (II) salts have been reported to be exceptionally effective in activating persalts under mild conditions. U.S. Pat. No. 4,481,129 discloses bleach compositions containing manganese (II) salts in conjunction with carbonate compounds. U.S. Pat. No. 4,478,733 describes bleach compositions containing manganese (II) salts in conjunction with aluminosilicate cationexchange materials. U.S. Pat. No 4,488,980 reports a bleach beneficial interaction between a condensed phosphate/alkali metal orthophosphate mixture and manganese (II) salts.

Bare heavy metal cations as disclosed in these patents, even when chelated, accelerate wasteful peroxide decomposition reactions that are non-bleach effective. Under alkaline conditions, as when used with laundry cleaning compositions, metal cations undergo irreversible oxidation and no longer catalyze. Perversely, the peroxide bleaching reaction is most effective at high pH.

Another problem with bare cations such as manganese (II) is that when utilized for whitening laundry, the free manganese ions deposit on the fabric. Strong oxidants, such as hypochlorites, are frequently included in laundry washes. Manganese ions will react with these strong oxidants to form highly staining manganese dioxide.

Stain problems resulting from free manganese ions have been overcome by binding the heavy metal ion to a water-insoluble support. Thus, European Patent Application No. 0 025 608 reveals a peroxide decomposition catalyst consisting of zeolites whose cations have been exchanged for heavy metals such as manganese. Co-pending U.S. patent application Ser. No. 597,971 discloses an activator comprising a water-soluble manganese (II) salt adsorbed onto a solid inorganic silicon support material, the combination having been prepared at a pH from 7.0 to 11.1.

In European Pat. No. 0 072 166, it was proposed to pre-complex catalytic heavy metal cations with a sequestrant and dry-mix the resultant product, in particulate form, with the remainder of the peroxygen containing detergent composition. Storage stability was found to be thereby improved. The patent notes that the complex of catalytic heavy metal cation and sequestrant can be agglomerated in a matrix of pyrophosphates, orthophosphates, acid orthophosphates and triphosphates.

While the foregoing systems provide adequate bleaching, three further problems must still be overcome. Upon storage, the catalyst and peroxide bleach particles interact resulting in loss of bleach activity during storage. Secondly, the catalyst particles are in the form of a fine powder. When blended with detergent granules, the catalyst powder is easily segregated falling to the bottom of the detergent package. A final problem is the formation of brown manganese dioxide in the detergent package during storage. Not only does the blend become aesthetically unpleasing, but manganese dioxide can deposit on fabric substrates during washing giving unsightly brown stains.

Co-pending U.S. patent application Ser. No. 668,536 reports solving the foregoing problems by binding manganese (II) cations to a "ligand" such as zeolite to form a complex. This complex is then protectively enclosed in a matrix of water-soluble or waterdisplacable materials. Examples of suitable coatings include modified starch, polyvinyl pyrrolidone, polyvinyl alcohol and sodium carboxymethyl cellulose. Most coating techniques were said to be suitable including pan-granulation, rolling drum blending, spray-drying and extrusion.

A further investigation of the aforementioned invention has found that not all protective coatings are readily shed when the granules are dispersed in water. Both the physical form and process conditions are now known to have an important influence on the performance of the resultant catalyst. The catalyst particles must release the manganese/aluminosilicate grains from the matrix within a prescribed time. When used with automatic washing machines, release must occur within minutes of water contact.

Consequently, it is an object of the present invention to provide a process to prepare a bleach catalyst of improved package storage stability that rapidly releases active partially manganese exchanged aluminosilicate particles upon dispersion in water

SUMMARY OF THE INVENTION

A process for the preparation of bleach catalysts in aggregate form, exclusive of any peroxide compound within the aggregate, is provided comprising the steps of:

(i) adsorbing a manganese (II) cation onto an aluminosilicate support material having an average diameter size of about 2 to 10 microns, the ratio of manganese (II) cations to aluminosilicate ranging from about 1:1000 to 1:10, the combined weight of manganese (II) cation and aluminosilicate support material being from 1 to 99% of the total catalyst;

(ii) granulating a wet mass buy subjecting aggregates of said wet mass to collisions having a velocity greater than 10 meters/sec, said wet mass comprising aluminosilicate support material, with manganese (II) cations adsorbed thereon, in the presence of from about 0.1 to 40% of a binder, the amount based on a dry solids weight content of the total aggregate, and wherein neither the aggregates nor their components have a pH of more than 10; and (iii) drying the resultant aggregates and wherein at least 70% of said dried aggregates have a diameter size ranging from at least 250 to about 2000 microns.

A process consolidating adsorption and granulation steps of the foregoing process is also disclosed. The process allows preparation of bleach catalysts in aggregate form, exclusive of any peroxy compound within the aggregate, comprising the steps of:

(i) granulating a wet mass by subjecting aggregates of said wet mass to collisions having a velocity greater than 10 meters/sec, said wet mass comprising:
  (a) an aluminosilicate support material having an average diameter size of about 2 to 10 microns;
  (b) a manganese (II) cation, the ratio of manganese (II) cation to aluminosilicate support material ranging from about 1:1000 to 1:10, and the combined weight of manganese (II) cation and aluminosilicate support material being from 1 to 99% of the total catalyst;
  (c) from about 0.1 to about 40% of a binder, the amount based on a dry solids weight content of the total aggregate, and wherein neither the aggregates nor their components have a pH of more than 10;

(ii) drying the resultant aggregates and wherein at least 70% of said dried aggregates have a diameter size ranging from at least 250 to about 2000 microns.

DETAILED DESCRIPTION OF THE INVENTION

In a co-pending U.S. pat. application Ser. No. 805,530, it has been reported that the aluminosilicate support material must be one having an average particle diameter size of about 2 to 10 microns (a very fine powder). Larger diameter aluminosilicate particles would have a smaller overall surface area. These would not be as reactive. Therein, it has been noted that while finely powdered manganese exchanged aluminosilicate is catalytically active in the wash, if blended as a powder it segregates in the package and adversely interacts with peroxygen compounds upon storage. Aggregation of finely powdered aluminosilicate into larger granules has solved the problem of segregation and storage instability.

Particle size of the catalyst aggregates has, thus, been found to be a crucial factor overcoming the difficulties of the prior art. At least 70% suferably at least of the aggregates must have an average diameter ranging from at least 250 to about 2000 microns. Preferably, aggregate diameters should range from 500 to 1500 microns, more preferably 900 to 1200 microns.

It has now been found that the method of granulation is highly important in achieving the particle size required of the aggregates to meet their performance specifications. The process must provide excellent distribution of a binder and a high velocity mixing applied to the mixture.

The high disruptive force is herein defined as one imparting velocities in excess of 10 m/sec to at least some aggregates as they agglomerate to disrupt their growth. The high velocity mixing minimizes accumulation of oversized granules. One technique to impart a high velocity mixing is by used of a metal surface that runs through the bed of agglomerated mass at high velocity. Illustrative of such metal surfaces are the intensifier ("beater") bar or rotating rotor tool as found in a Patterson-Kelly Twin Shell Blender and Eirich RV02 Mixer, respectively.

Particles formed in granulation equipment can be broken (fractured or disrupted) if the external forces acting upon them exceed the internal forces binding them together. External forces arise principally from collisions with other particles or with the granulation equipment itself. In these collisions, the particles are accelerated to high velocities or decelerated from high velocities and disrupted if the resultant external force is sufficiently larger.

Since these high velocities are produced by the granulation equipment, one can classify types of granulation equipment by maximum possible particle velocities generated by that equipment. If the collision were elastic, then momentum would be conserved and the particles would have finite velocities (albeit in the opposite direction) after the collision. Since agglomerated masses such as wet particles are plastic in behavior, these collision are not elastic and momentum is not conserved. Rather, the kinetic energy of the collisions are converted to deformational energy resulting in the particle being deformed and possibly fractured.

Accordingly, the most appropriate method for estimating the disruptive forces in a granulatin device is to simply approximate the kinetic energy of the collision. Kinetic energy of a mass (m) moving with a velocity (v) may be expressed as: $KE=\frac{1}{2}mv^2$. Assuming that the massive granules forming in different types of granulation equipment are similar, then the relative KE is simply proportional to $v^2$.

For gravity equipment $v=mgh$, the velocity value being proportional to the force of gravity presuming that there are no angles reducing the effective pull of gravity. For equipment with parts moving at high velocities such as those with a spinning rotor tool, blades, etc., the maximum velocity corresponds to the tip speed of the fastest moving equipment with parts moving at high velocities such as those with a spinning rotor too, blades, etc., the maximum velocity corrresponds to the tip speed of the fastest moving equipment part. Where the latter is a spinning rotor tool, $v=(\pi D)(N)$, where D is the rotor circumference and N is the frequency in spins per minute. Geometry (D) and rpms (N) determined the velocity. The velocities in forced spinning equipment can be much higher than in gravity equipment.

Illustrative of gravity force equipment is the pan granulator and O'Brien rolling drum. Spinning force equipment is illustrated buy the Schugi Flexomix and Eirich RV02 intensive mixers. Maximum particle velocities typical of these granulators are list below. The data was generated with an Eirich RV02 intensive mixer.

Granulation Yield vs. Particle Velocity

| Test | Tip Speed meters/sec | Tip Speed rpm | Smallest/Largest Particle Size (microns) | Yield % (250–2000μ) | Mean Particle Size* |
|---|---|---|---|---|---|
| 1 | 26.2 | 3300 | 125/>2380 | 83.1 | 1416 |
| 2 | 18.10 | 2280 | <125/>2380 | 74.9 | 1493 |
| 3 | 13.10 | 1650 | <125/>2380 | 74.0 | 1434 |
| 4 | 9.05 | 1140 | Unprocessable** | | |

*Rosin-Rammler $\bar{x}$ in microns
**Mass granulated as large (>¼ inch) agglomerates and fines (<125 mesh or 125 microns)

Tip speeds which subject the aggregates of the wet mass to collisions having a velocity of 9.05 meters per second resulted in an unprocessable mixture of very large and very fine sized agglomerates. By contrast, when the speed was increased to 13.10 meters per second, a reasonably narrow range of particle sizes resulted wherein 74% of the dried aggregates had a diameter size ranging from at least 250 to 2000 microns. Similarly favorable results occured with increased tip speeds of 18.10 and 26.2 meters per second.

Agglomerated particles resulting from the granulation process must be dried to remove water. Less than about 12% water should remain in the final dried agglomerated particles. If greater amounts of water are present, they will adversely interact with peroxy compounds to destabilize them. The peroxides will decompose at a greater rate during storage.

There are many known methods useful for drying the agglomerated particles of this invention. Granules may be dried without agitation, for example, in a tray oven. Agitated drying such as with a fluid-bed drier, may also be utilized successfully.

In one embodiment of the process, the adsorption of manganese on the aluminosilicate support material is practiced in a step separate from that of granulation with the binder. Therein a manganous salt in aqueous solution is added to a slurry of the aluminosilicate support material. The pH of the slurry is held between 7.0 and 11.1. Upon stirring for a short period of time, the manganese is adsorbed onto the aluminosilicate. Manganese exchanged zeolite material is then recovered by filtering the solids from the slurry. This material or a portion thereof is then flash-dried and fed into the granulation apparatus.

In a second embodiment, it has been discovered that effectively performing catalyst is obtainable when the manganese adsorption and granulation procedures are performed within a single operation. Thus, aqueous solutions of the manganous salt and a binder or combinations of these elements are mixed with hydrated pH 7 to 11 adjusted aluminosilicate. The combination was agglomerated in a high velocity apparatus such as found in the Eirich RV02 Intensive Mixer. Resultant agglomerates were then subjected to fluid bed drying. Catalyst product derived from this procedure exhibited bleach activation and non-staining properties similar to that of granulated material made by the preadsorbed method.

Among the aluminosilicates, synthetic zeolites are particularly suitable as the support material. Preferred are those zeolites designated as A and 13X type. These zeolites are sold by the Union Carbide Corporation under the designation ZB-100 and ZB-400, respectively. ZB-100 and ZB-400 have average pore sizes of 4 and 10 Angstroms, respectively. Additional sources of these zeolites are Crosfields, Ltd., Philadelphia Quartz, Huber and the Ethyl Corporations.

Another type of suitable support material is the silicoalumino phosphates (SAPOs). These materials are also commercially available from Union Carbide. SAPOs have a wide range of compositions within the general formula $0\text{-}0.3R(Si_xAl_yP_z)0_2$ where x, y and z represent the mole fractions of Si, Al and P, respectively. The range for x is 0.01 to 0.98, for y from 0.01 to 0.60, and for z from 0.01 to 0.52. R refers to the organic template that is used to develop the structure of the particular SAPO. Typical templates used in preparing SAPOs are organic amines or quaternary ammonium compounds. Included within the SAPO family are structural types such as $AlPO_4$-16, Sodalite, Erionite, Chabazite, $AlPO_4$-11, Novel, $AlPO_4$-5 and Faujasite.

The manganese used in the present invention can be derived from any manganese (II) salt which delivers manganous ions in aqueous solution. Manganous sulfate and manganous chloride or complexes thereof, such as manganous triacetate, are examples of suitable salts.

Finished catalyst will contain from about 0.1% to about 5.5% manganese (II) per weight of solid support. Preferably, the amount of manganese (II) is from about 1 to about 2.5% on an anhydrous basis defined as Mn/anhydrous support +Mn). When dispersed in water, the catalyst should deliver a minimum level of 0.5 ppm manganese (II) ion to the aqueous solution. For instance, if a catalyst has 1 weight % of manganese then there is required at least 50 milligrams catalyst per liter of aqueous solution.

The catalyst and compositions of this invention may be applied to either flexible or hard substrates such as fabrics, dishes, dentures, tiles, toilet bowls and ceramic floors. Flexible substrates, specifically fabrics, will, however, be focused upon in the subsequent discussion.

A binder is an essential element of the catalyst aggregates. It will be present from about 0.1 to 40% by weight of the aggregate, preferably from about 5 to 20%, ideally from about 5 to 10%. The binder is a water-soluble, water-dispersible material, preferably organic, and will have a pH no higher than 11. Binders may be selected from organic homo-polymers or hetero-polymers, examples of which are starches, cellulose ethers, gums and sugars. Long chain C10-C22 fatty acids and fatty acid soaps may also be suitable binders. Inorganic materials may be used as binders if they meet the pH limitation of no greater than 10, preferably less than 9.5 and more preferably less than 7, and other limitations as herein provided. Illustrative of this category are the so-called glassy sodium phosphates of the molecular structure: $Na_2O_4P[NaO_3P]_nPO_3Na_2$, wherein the average value of n is from about 10 to 30. Silicates are unacceptable as binders because their pH is greater than 10.

Starches are preferred because of their very favorable combination of good binding and fast water dispersing properties. Starches usually occur as discrete particles or granules having diameters in the 2 to 115 micron range. While most starches contain from 22 to 26% amylose and 70 to 74% amylopectin, some starches, such as waxy cornstarches, may be entirely free of amylose. It is intended to include within the term "starch" the various types of natural starches, including corn starch, potato starch, tapioca, cassava and other tuber starches, as well as amylose and amylopectin separately or in mixtures. Furthermore, it is also intended that such term stand for hydroxy-lower alkyl starches, hydroxyethyl starch, hydroxylated starches, starch esters, e.g., starch glycolates and other derivatives of starch having essentially the same properties.

Several modified starches are particularly preferred as binders. These include Nadex 320 TM and Nadex 341 TM, white corn dextrin hydrophobic derivative, also of low viscosity. Nadex 320 TM, Nadex 341 TM and Capsul TM are commercially available from the National Starch and Chemical Company, Bridgewater, New Jersey.

Gums and mucilages are carbohydrate polymers of high molecular weight, obtainable from plants or by synthetic manufacture. Among the plant gums that are of commercial importance may be mentioned arabic, ghatti, karaya and tragacanth. Guar, linseed and locust bean are also suitable. Seaweed mucilages or gums such as agar, align and carageenan are also within the binder definition.

Among the synthetic gums that are the most favored are the carboxymethyl celluloses such as sodium carboxymethyl cellulose. Other cellulose ethers include hydroxypropyl cellulose, methyl and ethyl celluloses, hydroxypropyl methyl cellulose and hydroxyethyl cellulose.

Among the organic homo-polymers and hetero-polymers are a multiplicity of materials. Commercially available water soluble polymers include polyvinylpyrrolidone, carboxyvinyl polymers such as the Carbopol TM sold by B. F. Goodrich Chemical Company and the polyethylene glycol waxes such as Carbowax TM sold by the Union Carbide Corporation. Polyvinyl alcohol and polyacrylamides are further examples.

Polyvinylpyrrolidone is a particularly useful binder. Commercially, it is available from the GAF Corporation under the designation PVP K-15, K-30, K-60 and K-90. These products differ in their viscosity grades, the number average molecular weights being about 10,000, 40,000, 60,000 and 360,000, respectively. PVP K-30 and K-60 are the preferred binders.

Binders within the definition of this invention must hold together the aluminosilicate particles in an agglomerate that is free flowing and non-sticky. Free-flow properties may be measured by the DFR test as outlined in U.S. Pat. No. 4,473,485 (Greene), herein incorporated by reference. Furthermore, suitable binders are those which provide for coherent agglomerates difficult to crush under ordinary finger pressure.

Another major criterion identifying both binder and resultant agglomerates is their readiness to disperse in water. A Dispersion Test for evaluation of this property has been devised which provides good reproducibility. The percent nondispersible particles are determined by placing 5 grams of sample agglomerate in 500 milliliters deionized water held at 40° C. and at a pH of 10. After stirring for two minutes, the solution is drained through a 120 micron diameter screen. Subsequently, the screen is dried and weighed. Less than 5% by weight of the original sample should remain on the screen. Greater amounts are deemed unacceptable. Failure to adequately de-agglomerate in water means the active manganese (II) on zeolite catalyst will not, to its fullest extent, desorb and contact the peroxygen compound. Bleaching efficiency is thereby impaired.

The following examples will more fully illustrate the embodiments of the invention. All parts, percentages and proportions referred to herein and in the appended claims are by weight unless otherwise indicated.

EXAMPLES 1-9

Catalyst Preparation 2-Step Method

A total of 5000 grams manganous chloride tetrahydrate were dissolved in 100 liters of distilled water. A separate vessel was charged with a slurry of 100 kilograms zeolite (Crosfields DB10) in 102 liters of water. The slurry pH was adjusted to between 9.0 and 9.5 with sulfuric acid. The manganese solution was fed into the zeolite slurry. Exchange was allowed for 45 minutes.

An Eirich Intensive Mixer (Model RV 02) was charged with 3 kilograms of the dried manganese exchanged on zeolite and with 1.153 kilograms of a 25% (by weight) aqueous PVP K-30 solution. The Eirich rotor and pan were operated at 26.2 meters/sec. and 65 rpm, respectively. Water was added until a total moisture level of about 35% was reached. Agglomeration was observed to occur between about 3 to 8 minutes into the blending, the time being dependent upon the amount and timing of water addition.

Thereafter, the agglomerated product was dried in a Aeromatic STREA-1 fluid bed dryer (manufactured by the Aeromatic Corporation). Target moisture level was 12.5% water or less. The original khaki color of the starting zeolite changed to antique white after being dried to the proper moisture level.

Table I outlines agglomeration reactants and properties of the resultant particles. Preparation of product in Examples 2–9 was essentially identical to that of Example 1 detailed above.

Example 2 uses sodium silicate as the binder. Silicate is unacceptable because the pH is about 12 which causes manganese oxidation visually observed as brown particles. Agglomerates prepared with silicate were poorly dispersible and had unacceptable browning properties.

Examples 3–7 illustrate agglomerates with various modified starch binders. Examples 7–9 illustrate the effect of increasing binder level on dispersion and porosity. As the binder level is increased, dispersibility increases but porosity decreases.

TABLE I

Agglomerates Prepared with the Eirich Intensive Mixer

| Example No. | Binder | g of Mn Exchanged Zeolite Added | Solution Added | Rosin-Rammler Average Particle Size (μm) | Distribution Coefficient (n) | % Non-dispersible | Porosity (cc Hg intruded/gm) |
|---|---|---|---|---|---|---|---|
| 1 | 10% PVP K-30 | 3000 | 1153 g of 25% soln. | 1606 | 2.42 | 0 | — |
| 2 | 5% RU Silicate | 1000 | 352 g of 5% soln. | 846 | 3.35 | >90 | — |
| 3 | 5% Purity Gum BE ®* | 3000 | 546 g of 25% soln. | 870 | 1.77 | 49.6 | — |
| 4 | 10% Purity Gum BE ®* | 3000 | 1153 g of 25% soln. | 1443 | 2.14 | 21.4 | — |
| 5 | 10% Nadex ® 320 | 3000 | 1153 g of 25% soln. | 1480 | 0.83 | 9.0 | — |
| 6 | 10% Capsul ® | 3000 | 1153 g of 25% soln. | 875 | 1.44 | 12.2 | — |
| 7 | 10% 78-0059* | 3000 | 1153 g of 25% soln. | 893 | 2.17 | 8.0 | 0.2194 |
| 8 | 20% 78-0059* | 3000 | 1025 g of 60% soln. | 883 | 2.10 | 5.1 | 0.1110 |
| 9 | 40% | 3000 | 2343 g of | 684 | 1.86 | 1.0 | 0.0 |

TABLE I-continued

| | | Agglomerates Prepared with the Eirich Intensive Mixer | | | | | |
|---|---|---|---|---|---|---|---|
| Example No. | Binder | g of Mn Exchanged Zeolite Added | Solution Added | Rosin-Rammler Average Particle Size (μm) | Distribution Coefficient (n) | % Non-dispersible | Porosity (cc Hg intruded/gm) |
| | 78-0059* | | 70% soln. | | | | |

*Both Purity Gum BE ® and 78-0059 are converted waxy starches soluble in cold water. Purity Gum BE ® is a hydrophobic derivative of starch with a low-medium viscosity; 78-0059 is a stabilized starch of low viscosity; both are products of the National Starch Corporation.

EXAMPLE 10

Low Shear Apparatus Catalyst Preparation

Attempts were made with a number of granulation machines to provide catalysts with the designated particle size distribution. None of the following granulators provided particles having the requisite properties.

Dravo Pan Granulator—five pounds of 4A zeolite, onto which manganous (II) ions had been adsorbed, were mixed with a 10% aqueous solution of Neodol 45-13 (a nonionic surfactant from the Shell Chemical Company) in a Dravo Pan Granulator. Zeolite was charged while the pan rotated at 60 rpm. Aqueous nonionic binder was introduced to the zeolite slurry by means of a syringe. Agglomeration did not occur. Instead, zeolite adhered to the pan without the formation of an agglomerate.

Eirich Pan Granulator—1250 grams of manganese (II) adsorbed onto zeolite was slurried in water and charged to an Eirich Pan Granulator using an Accu-Rate Volumetric Feeder. Zeolite did not pelletize well. Those pellets that did form disintegrated immediately as they exited the granulator. No agglomerates were formed.

Rolling Drum Agglomerator—1350 grams of 4A zeolite were charged to a Rolling Drum apparatus. A 22% aqueous solution of tallow/coco soap (82/18 ratio) was sprayed into the drum using a two fluid nozzle. Processing was difficult to control. Yields of 14–35 mesh particle size were only 13%. Resultant agglomerates were soft and mushy. They did not dissolve well in water.

EXAMPLE 11

A single step heavy metal ion exchange and catalyst granulation is herein described. An Eirich Intensive Mixer RV 02 was charged with 3.0 kg Crosfields DB10 zeolite powder and 1.2 kg of a 25% aqueous solution of PVP K-30 binder containing 20 g concentrated 12N sulfuric acid. The mixture was churned at a rotor tip speed of 26.2 m/s and bowl speed of 60 rpm. A manganese sulfate aqueous solution of 121 g manganous sulfate and an equal amount of water were slowly added thereto. Exchange occurred under mixing over a period of 6–8 minutes. The resultant agglomerates were dried in a fluid bed drier for about 0.5 hours at 80° C. Final product water content was between 7 and 11%.

Bleaching tests were conducted with a 4 pot Terg-0-Tometer from the U.S. Testing Company. Wash solutions were prepared from distilled water with hardness ions added to provide 60 ppm of calcium and magnesium (2:1), defined on a calcium carbonate basis. The wash volume was 1 liter. Temperature was maintained at 40° C. Agitation was provided throughout a 14 minute wash period.

Bleaching was monitored by measuring reflectance of a dry cotton cloth (4″×6″). Prior to bleaching, the cloth had been uniformly stained with a tea solution and washed several times in a commercial detergent. Reflectance was measured on a Gardner XL-23 Reflectometer.

The catalyst, prepared in the one-step procedure, was blended (0.151 gram catalyst delivering 2.0 ppm manganese ion) with 1.158 grams of detergent base powder and 0.391 grams sodium perborate monohydrate. The change in reflectance for the single step adsorption/-granulation was essentially identical (about 7 units) with the two-step process outlined in Example 1. Hence, bleaching effectiveness was not impaired by eliminating one of the steps.

EXAMPLE 12

Illustrated here is the effect of the average aggregate diameter size on storage stability of sodium perborate when these components are packaged together.

The catalyst aggregates were formed, according to the process of Example 1, from 86.38 parts zeolite, 3.62 parts manganous chloride and 10 parts PVP K-30 binder. Catalyst (0.151 grams) and detergent powder containing 0.391 grams sodium perborate monohydrate were blended together. A 1.7 gram sample of the detergent blend was placed in an open petrie dish and stored at 80° F./80% relative humidity over an 8-day period. Samples were measured for percent available oxygen (Avox %) using a Kyoto Auto-Titrator. Avox measurements were taken at the beginning of the experiment and after the 8-day storage period. There were also visual inspections to note any discoloration and gross physical changes. Results of this test are shown in Table III.

TABLE III

| U.S. Mesh Size | Particle Size (Microns) | Initial* Avox % | Final Avox % (± Std. Dev.) | Loss % | Catalyst Visual Inspection |
|---|---|---|---|---|---|
| 10 to 14 | 1405 to 2000 | 3.43 | 3.10 ± .018 | .33 | Granular, light brown |
| 25 to 35 | 500 to 700 | 3.43 | 2.47 ± .209 | .86 | Granular darker brown |
| 60 to 80 | 177 to 250 | 3.43 | 0.56 ± .212 | 2.87 | Sludge, very dark brown Not granular |

*The initial available oxygen reading of 3.43 ± .1% is the mean of three replicate runs.

The results in Table III show that storage stability improves with increasing size of the agglomerated particle. Loss of available oxygen (2.87%) is significant for particle sizes of 177–250 microns. When the particles are between 500 and 2000 microns, the blend is satisfactorily stable (Avox loss ≦0.86%). Table III also reports that agglomerated particles in the range 177–250 microns cause the detergent blend to turn dark brown. Original granular material was observed to have turned into sludge. The larger particle size agglomerate containing detergent blend also exhibited some color darkening. However, discoloration was not severe and the granular quality of the blend remained.

The foregoing description and Examples illustrate selected embodiments of the present invention and in light thereof variations and modifications will be suggested to one skilled in the art, all of which are in the spirit and purview of this invention.

We claim:

1. A process for the preparation of bleach catalysts in aggregate form, exclusive of any peroxide compound within the aggregate, comprising the steps of:

(i) adsorbing a manganese (II) cation onto an aluminosilicate support material having an average diameter size of about 2 to 10 microns, the ratio of manganese (II) cations to aluminosilicate ranging from about 1:1000 to 1:10, the combined weight of manganese (II) cation and aluminosilicate support material being from 1 to 99% of the total catalyst;

(ii) granulating a wet mass by subjecting aggregates of said wet mass to collisions having a velocity greater than I0 meters/sec said wet mass comprising aluminosilicate support material, with manganese (II) cations adsorbed thereon, in the presence of from about 0.1 to 40% of a binder, the amount based on a dry solids weight content of the total aggregate, and wherein neither the aggregates nor their components have a pH of more than 10; and (iii) drying the resultant aqqreqates and wherein at least 70% of said dried aggregates have a diameter size ranging from at least 250 to about 2000 microns.

2. A process according to claim 1, wherein the particle diameter size ranges from 900 to 1500 microns.

3. A process according to claim 1, wherein the binder is selected from the group consisting of starches, cellulose ethers, gums and sugars.

4. A process according to claim 1, wherein the binder is a long chain $C_{10}$–$C_{22}$ fatty acid or soap thereof.

5. A process according to claim 1, wherein the binder is a modified starch.

6. A process according to claim 1, wherein the binder is polyvinylpyrrolidone.

7. A process according to claim 1, wherein the aluminosilicate support material is a synthetic zeolite having a pore size of from about 4 to about 10 Angstroms.

8. A process according to claim 1, wherein the aluminosilicate support material is a silicoalumino phosphate.

9. A process according to claim 1, wherein the amount of manganese (II) cation is present from about 1 to about 2.5% by weight of aluminosilicate support material.

10. A process according to claim 1 wherein said velosity is at least about 20 meter/seconds.

11. A process for the prepartation for the preparation of bleach catalysts in aggregate form, exclusive of any peroxy compound within the aggregate, comprising the steps of:

(i) granulating a wet mass by subjecting aggregates of said wet mass to collisions having a velocity greater than 10 meters/second, said wet mass comprising:

(a) an aluminosilicate support material having an average diameter size of about 2 to 10 microns;

(b) a manganese (II) cation, the ratio of manganese (II) cation to aluminosilicate support material ranging from about 1:1000 to 1:10, and the combined weight of manganese (II) cation and aluminosilicate support material being from 1 to 99% of the total catalyst;

(c) from about 0.1 to about 40% of a binder, the amount based on a dry solids weight content of the total aggregate, and wherein neither the aggregates nor their components have a pH of more than 10;

(ii) drying the resultant aggregates and wherein at least 70% of said dried aggregates have a diameter size ranging from at least 250 to about 2000 microns.

12. A process according to claim 11, wherein the particle diameter size ranges from 900 to 1500 microns.

13. A process according to claim 11, wherein the binder is selected from the group consisting of starches, cellulose ethers, gums and sugars.

14. A process according to claim 11, wherein the binder is a long chain $C_{10}$–$C_{22}$ fatty acid or soap thereof.

15. A process according to claim 11, wherein the binder is a modified starch.

16. A process according to claim 11, wherein the binder is polyvinylpyrrolidone.

17. A process according to claim 11, wherein the aluminosilicate support material is a synthetic zeolite having a pore size of from about 4 to about 10 Angstroms.

18. A process according to claim 11, wherein the aluminosilicate support material is a silicoalumino phosphate.

19. A process according to claim 11, wherein the amount of manganese (II) cation is present from about 1 to about 2.5% by weight of aluminosilicate support material.

20. A process according to claim 11, wherein said velocity is at least 20 meter/second.

* * * * *